(12) United States Patent
Horton et al.

(10) Patent No.: US 6,959,767 B2
(45) Date of Patent: Nov. 1, 2005

(54) REMEDIATION TREATMENT OF SUSTAINED CASING PRESSURES (SCP) IN WELLS WITH TOP DOWN SURFACE INJECTION OF FLUIDS AND ADDITIVES

(75) Inventors: Robert L. Horton, Sugar Land, TX (US); John W. Powell, Shreveport, LA (US); William E. Foxenberg, Houston, TX (US); David Kippie, Katy, TX (US)

(73) Assignee: M-I LLC, Houston, TX (US)

( * ) Notice: Subject to any disclaimer, the term of this patent is extended or adjusted under 35 U.S.C. 154(b) by 100 days.

(21) Appl. No.: 10/605,188

(22) Filed: Sep. 12, 2003

(65) Prior Publication Data

US 2004/0216882 A1 Nov. 4, 2004

(Under 37 CFR 1.47)

Related U.S. Application Data

(60) Provisional application No. 60/319,547, filed on Sep. 12, 2002.

(51) Int. Cl.$^7$ .............................................. E21B 43/12
(52) U.S. Cl. ......................... 166/403; 166/295; 175/72
(58) Field of Search ............................. 166/403, 272.4, 166/292, 295; 175/72

(56) References Cited

U.S. PATENT DOCUMENTS

| | | | | |
|---|---|---|---|---|
| 4,420,406 A | * | 12/1983 | House et al. | ............... 507/216 |
| 5,009,798 A | * | 4/1991 | House et al. | ............... 507/216 |
| 5,095,987 A | * | 3/1992 | Weaver et al. | ............... 166/276 |
| 5,316,086 A | * | 5/1994 | DeMoss | ................. 220/254.5 |
| 6,063,737 A | * | 5/2000 | Haberman et al. | ........... 507/261 |
| 6,186,239 B1 | * | 2/2001 | Monjure et al. | ............ 166/384 |
| 6,218,343 B1 | * | 4/2001 | Burts, Jr. | .................... 507/225 |
| 6,283,213 B1 | * | 9/2001 | Chan | .......................... 166/291 |

FOREIGN PATENT DOCUMENTS

GB 2116230 A 9/1983 ............ C09K/7/02

OTHER PUBLICATIONS

Bourgoyne A. et al. "Sustained Casing Pressure in Offshore Producing Wells;" Annual Offshore Technology Conference No. 11029, May 3, 1999; pp. 1–13, 109; XP002140070.

Database WPI; Section Ch, Week 198625; Derwent Publications Ltd., London, May 20, 1996 Abstract XP–002280069.

Carpenter, R.B. et al.; "Alloy Annular Plugs Effective for Casing Annular Gas Flow Remediation Sustained Casing Pressure Potential Threat" Offshore, Petroleum Publishing Co., Tulsa; vol. 62, No. 3; Mar., 2002; pp. 72–73, 109; XP001116571.

International Search Report—International Application No. PCT/US 03/28568—International Filing Date Sep. 9, 2003—Applicant: M–I L.L.C.

* cited by examiner

Primary Examiner—Frank Tsay
(74) Attorney, Agent, or Firm—Osha Liang LLP

(57) ABSTRACT

A method of injection of a higher density fluid into the top of the annulus of a well while lower density fluid is withdrawn from the top of the annulus of the well, wherein the higher density fluid has a composition such that it will drop through the lower density fluid without dispersing therein, thus flowing into the deeper reaches of the annulus and not short circuiting through the top of the annulus to the point from which the lower density fluid is intended to be withdrawn. A method of injection of a higher density fluid into the top of the annulus of a well without simultaneously withdrawing a lower density fluid from the top of the annulus of the well, wherein the higher density fluid has a composition such that it will drop through the lower density fluid without dispersing therein, thus flowing into the deeper reaches of the annulus so that when the pressure induced in the annulus as a result of this injection is subsequently bled off, principally the lower density fluid will be that which is withdrawn.

8 Claims, No Drawings

REMEDIATION TREATMENT OF SUSTAINED CASING PRESSURES (SCP) IN WELLS WITH TOP DOWN SURFACE INJECTION OF FLUIDS AND ADDITIVES

CROSS REFERENCE TO RELATED APPLICATIONS

Priority of U.S. Provisional Application No. 60/319,547, filed Sep. 12, 2002 is claimed.

BACKGROUND

Sustained casing annulus pressure (SCP) due to the influx of pressured liquids or gases, water or hydrocarbon, from unknown points of entry and at unknown depths is a large-scale problem and presents safety hazards and regulatory concerns in the oil and gas industry. It is estimated that over 8,000 wells and 11,000 annuli are affected in the offshore Gulf of Mexico Region. A failure to control the casing annulus pressures below maximum allowable limits may result in a well blowout or other uncontrolled event that may result in significant loss of property, environmental impact, and potentially loss of life.

The injection of high-density brine solutions into the casing annulus has typically been used to control the casing annulus pressure. However, injecting or displacing denser fluids into the casing annulus of a well, without having to undergo significant well operations is difficult. The principle difficulty arises from the fact that often the casing annulus space, into which the fluid must be injected, is sealed on both ends and may be an inner or outer string without access other than through a valve on the casing head or spool. This makes the displacement of the existing fluid in the casing annulus space very difficult.

Current technologies often rely upon the systematic injection and bleed off of small amounts of brine fluid resulting in the over dilution of the more dense brine fluid. As the more dense brine fluid is injected and begins to drop through the less dense fluid, it also begins to disperse and mix with the less dense fluid; the hydrostatic pressure in the casing may thus increase somewhat due to the injection of the more dense brine into the casing annulus, but the more dense brine will not have dropped all the way to the bottom of the well; therefore, when it is time to bleed off fluid from the top to permit additional more dense brine to be injected, some of the more dense brine injected previously is dispersed in that which is bled off. Also, now the density of the fluid at the top of the casing is more dense than it was before, therefore the next injection of more dense brine will be attended with a slower rate of falling through the increasingly more dense top fluid and a greater degree of dispersion of the one into the other. Eventually this process of injection and bleedoff becomes self-limiting, often without increasing the hydrostatic pressure within the casing annulus enough to bring the casing pressure under control or even to keep up with the rate of increase in pressure. Injection tubes can be inserted to direct the injection of more dense brine slightly below the surface. However, these injection systems have not produced consistent results.

Thus, there exists a need for a top down process to introduce dense fluid, which is effectively immiscible, and drops without dispersing to the bottom of the annulus, efficiently displacing the less dense fluid, and raising the pressure in the casing annulus to the point where the pressure within the casing annulus is equal to or greater than that of the influx of fluids or gases, water or hydrocarbon, that had been bleeding into the annulus previously.

SUMMARY

The present invention addresses the ongoing industry need for an effective top down surface remediation process for lowering or eliminating sustained casing annulus pressure within an annulus due to the influx of formation or reservoir fluids by injecting fluids and additives with a rig-less injection process without interrupting well production. The preferred process introduces high-density brines, which have been engineered to be cohesive and non-dispersive, or effectively immiscible, by injection into the casing annulus or annuli of a well through a surface annulus valve while taking returns through a second annulus valve.

In one alternative illustrative method, the fluid is injected into a pressured annulus or annuli at the surface through a casing annulus valve by repetitive injection and bleedoff process called lubricating. The preferred illustrative embodiment of the process is carried out by injecting fluids of higher density, which have been engineered to be cohesive and non-dispersive, and allowing them to fall due to the pull of gravity.

The process involves fluids composed of a brine solution, viscosifying additives, for example biopolymers such as xanthan gum or modified xanthan gums or other biopolymer variants, hydroxethycelluloses and other known viscosifiers, which may be engineered or combined with or require rheology modifiers, surface tension reducers, thermal stabilizers, coalescing agents, soluble or insoluble weighting or bridging agents, sealants or other functional additives as determined by primary treatment response. The more dense fluids effectively behave like a separate, cohesive, immiscible phase as they drop without dispersing through a less dense fluid. As the denser fluid drops to the bottom of the casing annulus, the less dense fluid is simultaneously displaced to the top of the casing annulus where it subsequently is bled off simultaneously or by cyclic lubrication. In this manner the denser fluid displaces the less dense fluid and thus the density of the fluid column in the annulus is increased. By raising the density or hydrostatic pressure in the fluid column, further influx of pressured fluids or gases from the non-isolated source, in the production string or pressured formations, is prevented or mitigated and the casing annulus pressure is brought under control or into regulatory compliance.

These and other features of the present invention are more fully set forth in the following description of preferred or illustrative embodiments of the invention.

DETAILED DESCRIPTION

The present invention uses a preferred method of top down surface injection of high-density viscosified fluids and additives injected at the surface through a casing annulus valve while taking returns through a second casing annulus valve. The denser fluids are viscosified and drop rapidly through the unviscosified less dense annulus fluid without dispersing, displacing it with the more dense fluid and controlling the influx of gas or fluids. An alternative less optimal approach would be to inject through a single annulus valve when a second valve is not present using cycles of injection and bleed down known as lubrication. Another lubricating method utilizes a CARS unit (Casing Annulus (Pressure) Remediation System), which usually requires that the well be bled down to zero pressure while a small surface port, or tube is run into the annulus. This would not be possible in most situations as the further influx of fluid will be uncontrolled or accelerate, etc., and present unacceptable risks. Additionally, there would be a high likelihood that the port or tube would encounter some sort of obstacle or a narrowing or restriction of the small volume into which it was being inserted long before it had been extended into the deeper reaches of the annulus. As a result, it is extremely unlikely that the port or tube could be pushed down to a significant fraction of the total depth of the annulus into which it was being inserted. To access the deeper reaches of the annulus, the fluid would have to be engineered to fall much farther than the deepest extent of the port or tube without significantly commingling with the fluid already in the annulus. Lubricating a denser fluid into an annulus in small volumes that must drop through the less dense fluid through a process of injection and bleeding off of the less dense surface fluid raises the density in the annulus more slowly than the continuous injection and simultaneous bleed-off process.

A brine fluid with a significant density differential with respect to the less dense fluid can be formulated which can be injected rapidly or slowly and can fall rapidly through 200° F. $CaCl_2$ brine without readily dispersing. The fluid should fall through the less dense brine and should be cohesive enough to make it to the bottom or far enough down hole without dispersing to displace the less dense fluid as it settles to the bottom.

The fluids of the present invention generally comprise a liquid brine solution, a xanthan gum or an uncoated xanthan gum, and/or additional viscosifiers, rheology modifiers, surface tension reducers, thermal stabilizers, coalescing agents, oxygen scavengers, and corrosion inhibitors, but may also contain weighting and bridging agents, sealants and a variety of other additives to improve functionality.

The brines useful for the present invention include halide brines, formate brines, and acetate brines, such as, for example, those based on $ZnCl_2$, $ZnBr_2$, $CaBr_2$, $ZnBr_2/CaBr_2$ blends, $ZnBr_2/CaBr_2/CaCl_2$ blends, KBr, KI, $KHCO_2$, $KCH_3CO_2$, CsBr, CsI, $CsHCO_2$, $CsCH_3CO_2$, mixtures thereof and of similar compounds known to one of skill in the art.

The biopolymer xanthan gums useful for the present invention, but not all inclusive, include Flo-Vis, a premium grade, clarified water-dispersible xanthan gum available from M-I, LLC, and Flo-Vis L, a liquid, premium grade, clarified xanthan gum that is not glyoxal-coated and that is suspended in a water-miscible carrier fluid. Flo-Vis L is also available from M-I, LLC. Viscosifiers useful for the present invention include the following: Duo-Vis, a premium grade, high-molecular-weight biopolymer available from M-I, LLC, scleroglucan, hydroxyethyl cellulose (HEC), derivatized starches, synthetic polymers such as poly(ethylene glycol)(PEG), poly(diallyl amine), poly(acrylamide), poly(aminomethylpropylsulfonate[AMPS]), poly(acrylonitrile), poly(vinyl acetate), poly(vinyl alcohol), poly(vinylamine), poly(vinyl sulfonate), poly(styryl sulfonate), poly(acrylate), poly(methyl acrylate), poly(methacrylate), poly(methyl methacrylate), poly(vinylpyrrolidone), poly(vinyl lactam), co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, and vinylpyrrolidone or another vinyl lactam.

The thermal stabilizers, rheology modifiers, and coalescing agents useful for the present invention include but are not limited to lipids, fatty acid derivatives, tall oils, pH additives, alcohol esters, polysaccharides, amines and amine derivatives, glycol derivatives, and primary, secondary, and tertiary alcohols. The amine derivatives include the miscible amine derivatives, triethanolamine, methyldiethanol amine (MDEA), dimethylethanol amine (DMEA), diethanol amine (DEA), monoethanol amine (MEA), diglycolamine (DGA) or other suitable tertiary, secondary, and primary amines and ammonia. Additionally, methyldiethanol amine, dimethylethanol amine, diethanol amine, monoethanol amine, or other suitable tertiary, secondary, and primary amines and ammonia could be substituted, in whole or in part, for the triethanolamine. Suitable glycols and glycol derivatives include ethylene glycol, diethylene glycol, triethylene glycol, propylene glycol, dipropylene glycol, tripropylene glycol, ethylene propylene glycol, and the like. Suitable alcohols would include methanol, ethanol, propanol and its isomers, butanol and its isomers, pentanol and its isomers, hexanol and its isomers. In addition, it also is expressly within the scope of the invention that other mixed TEA systems may be used as additives, such as a TEA/glycol system or a TEA/alcohol system, as well as other mixed amine systems such as a DMEA/glycol system or a MDEA/alcohol system.

Sealants, weighting and bridging agents, and other additives may be useful in partial application or as system treating agents depending on the severity of the source of influx and the success or failure of the primary preferred system treatment. In general it is believed that most leaks falling within the MMS guidelines for bleed-down and rate of pressure build-up and maximum allowable pressure are one-way or of such a magnitude and rate to require rig intervention.

Generally it should be appreciated by one of skill in the art that many of the fluids of the present invention exhibit sufficient low-shear-rate rheology to be cohesive and maintain phase separation without dispersion. In addition the fluids have been designed to fall rapidly, and thus displace a less dense brine in the casing annulus. Finally, the fluids of the present invention should most preferably settle with a sharp interface on the bottom of the casing annulus. This combination of properties permits the injection of the fluid into the casing annulus without having to undertake the sequential injection process described in the alternative process or prior art. In addition, the fluids of the present invention will permit the injection of fluids into the casing annulus without having to utilize specialized injection tubing or other means of injection.

In a report entitled, Diagnosis and Remediation of Sustained Casing Pressure in Wells by Andrew K. Wojtanowicz, Somei Nishikawa, and Xu Rong, Louisiana State University, (submitted to the U.S. Department of the Interior, Minerals Management Service), studies were described which show that a strong relation exists between the performance of cyclic injection and chemical interaction of the brines with fluids (usually drilling muds) already in the annulus. Depending upon fluid compatibility, the performance might range from total elimination of casing pressure to extreme cases of no effect at all. Field observations have confirmed this conclusion. Furthermore, a key specific conclusion that can be drawn from this study is that an immiscible combination of kill and annulus fluids provides the most desirable performance for cyclic injection. In this case, the injected fluid would displace the annular fluid and kill the sustained casing pressures. It would seem from the conclusions of the LSU report that the best way to practice the art of the present invention would be to inject effectively immiscible or completely immiscible fluids rather than miscible fluids. However, there are many cases in which the injection of an immiscible higher density fluid into a well is impractical for economic reasons or for technical reasons such as, for example, that the immiscible fluid would have an unacceptable HSE profile, would interact adversely with elastomers already present in the well, or would lead to excessive corrosion when (as is the most likely situation) corrosion inhibitors compatible with both of the immiscible fluids could not be found. Another technical consideration involves the possibility that some wholesale leakage would occur, for example, in the case of parted casings or tubing, and the immiscible fluid could come into contact with yet another fluid with which an adverse incompatibility problem might arise. The same could be the for miscible fluids in some cases; however, with miscible fluids, these adverse incompatibility problems are typically much less likely. Parted casing or tubing very often begins with a leak or mechanical failure at the threads. Casing and tubing threads are increasingly susceptible to gas and fluid leaks with time, length, torque, heating/cooling, hardness, pressure, etc. Particular thread types seem more susceptible to one-way gas leaks and more so in jointed pipe run without isolation rings or seals.

The LSU report described above, entitled, Diagnosis and Remediation of Sustained Casing Pressure in Wells, does in fact capture a key element of truth in the need to utilize fluids that are immiscible. Accordingly, the teachings in accordance with the present invention are to inject fluids of higher density, which have been engineered to be cohesive and non-dispersive, and allowing them to fall due to the pull of gravity. The engineering to render the fluids cohesive and non-dispersive involves beginning with a higher density fluid that is miscible with and inherently compatible with the lower density fluids already in the annulus of the well. Then the addition of rheology modifiers and additives that cause surface tension reduction, coalescence, and thermal stabilization alters the performance of the higher density fluid so that, surprisingly, it behaves much like an immiscible fluid in the key respect that it can fall through the lower density fluid without dispersing therein.

Typically, the method of injection of the fluids in accordance with the present invention, comprises the steps of rigging up to the top of the annulus of the well through two valves, into one of which the higher density fluid is injected and from the other of which the lower density fluid is withdrawn. If the higher density fluid is properly engineered in accordance with the compositions of the present invention, it will drop through the lower density fluid into the deeper reaches of the annulus and will not short circuit through the top of the annulus to the valve from which the lower density fluid is intended to be withdrawn.

In another embodiment of the invention, the higher density fluid is injected through a CARS setup. This embodiment is similar to that just described above, except that the injection valve should be a ball valve with a large enough orifice that a length of smallbore tubing can be pushed through the orifice and reaching down some distance beyond the valve and into the deeper reaches of the annulus. This CARS arrangement will increase the distance between the injection point and the withdrawal valve, reducing somewhat the likelihood that the denser fluid would short circuit through the top of the annulus to the valve from which the lower density fluid is intended to be withdrawn. Nevertheless, it is recommended that even with the CARS configuration, the higher density fluid should be properly engineered in accordance with the compositions of the present invention, so that it will drop through the lower density fluid into the deeper reaches of the annulus and will not short circuit through the top of the annulus to the valve from which the lower density fluid is intended to be withdrawn.

The following example is included to demonstrate a preferred embodiment of the invention. It should be appreciated by those of skill in the art that the techniques disclosed in the example which follows represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Unless otherwise stated, all starting materials are commercially available and standard laboratory techniques and equipment are utilized. The tests were conducted in accordance with the procedures in API Bulletin RP 13B-2, 1990. The following abbreviations are sometimes used in describing the results discussed in the examples: Values of viscosity are measured at the given rpm rate.

"PV" is plastic viscosity (CPS) which is one variable used in the calculation of viscosity characteristics of a drilling fluid.

"YP" is yield point (lbs/100 ft $^2$) which is another variable used in the calculation of viscosity characteristics of drilling fluids.

"F/L" is API fluid loss and is a measure of fluid loss in milliliters of drilling fluid at 100 psi.

EXAMPLE 1

The following example illustrates the properties and characteristics of the fluids formulated in accordance with and for use with the present invention.

LABORATORY PROCEDURES: 100 ml graduated cylinders were filled with 11.6 ppb $CaCl_2$ brine and heated to 200° F. in a water bath. Individual cylinders were then removed from the bath and 20 mls of test fluid were injected into the cylinder using a syringe. Each of the test fluids was formulated in accordance with the present invention and generally were composed as follows: Test Fluid A is an 18.6 ppb brine containing 4 ppb Flo-Vis L.

Test Fluid B is an 18.6 ppb brine containing 4 ppb Flo-Vis L and 2 ppb Safe-Buff, an inorganic (MgO) buffer.

Test Fluid C is an 18.6 ppb brine containing 4 ppb Flo-Vis L and 2 ppb Safe-Buff, and 3% by volume of ECF-687 which is a mixture of 2,2,4-trimethyl-1,2-pentadiol monoisobutyrate (CAS 25265-77-4) and $C_{16}$–$C_{18}$ fatty acids (CAS 67701-07-9).

Test Fluid D is an 18.2 ppb brine containing 4 ppb Flo-Vis L.

Test Fluid E is an 18.2 ppb brine containing 4 ppb Flo-Vis L and 2 ppb Safe-Buff, and 3% by volume of ECF-687 which is a mixture of 2,2,4-trimethyl-1,2-pentadiol monoisobutyrate (CAS 25265-77-4) and $C_{16}$–$C_{18}$ fatty acids (CAS 67701-07-9).

The properties of each of the test fluids is given in Table 1 below:

TABLE 1

| Test Fluid   | A   | B   | C   | D   | E     |
|--------------|-----|-----|-----|-----|-------|
| 600 rpm      | 90  | 106 | 112 | 154 | 206   |
| 300 rpm      | 57  | 67  | 72  | 106 | 146   |
| 200 rpm      | 46  | 54  | 60  | 86  | 124   |
| 100 rpm      | 30  | 35  | 39  | 64  | 97    |
| 6 rpm        | 7   | 8   | 10  | 23  | 42    |
| 3 rpm        | 4   | 5   | 7   | 18  | 35    |
| PV           | 33  | 39  | 40  | 48  | 60    |
| YP           | 24  | 28  | 32  | 58  | 86    |
| LSRV, 1 min. |     |     |     |     | 70385 |
| LSRV, 2 min. |     |     |     |     | 71185 |
| LSRV, 3 min. |     |     |     |     | 71185 |
| LSRV, 6 min. |     |     |     |     | 70985 |

In view of the above, one of ordinary skill in the art should appreciate that the fluids of the present invention posses a sufficient density and viscosity to be cohesive and not be dispersed during the injection process. Also it should be appreciated that the fluids of the present invention should be capable of rapidly sinking under the influence of gravity and thus should be capable of displacing less dense fluids in a casing annulus.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A method for treating the sustained casing annulus pressure in a casing annulus of a subterranean well, wherein the casing annulus contains a casing annulus fluid, the method comprising: injecting into the casing annulus a viscosified brine, wherein the viscosified brine has a density greater than the density of the casing annulus fluid and wherein the viscosified brine includes a viscosifying additive selected from the group consisting of:

xanthan gums; scleroglucan; hydroxyethyl cellulose (HEC); starch; poly(ethylene glycol)(PEG); poly(diallyl amine); poly(acrylamide); poly(aminomethylpropylsulfonate[AMPS]); poly(acrylonitrile); poly(vinyl acetate); poly(vinyl alcohol); poly(vinylamine); poly(vinyl sulfonate); poly(styryl sulfonate); poly(acrylate); poly(methyl acrylate); poly(methacrylate); poly(methyl methacrylate); poly(vinylpyrrolidone); poly(vinyl lactam); co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, and vinylpyrrolidone, vinyl lactam; and mixtures and combinations thereof.

2. The method of claim 1, wherein the viscosified brine includes a salt selected from the group consisting of halide brines, formate brines, and acetate brines.

3. The method of claim 1, wherein the viscosified brine includes a salt selected from the group consisting of $ZnCl_2$, $ZnBr_2$, $CaBr_2$, $ZnBr_2/CaBr_2$ blends, $ZnBr_2/CaBr_2/CaCl_2$ blends, KBr, KI, $KHCO_2$, $KCH_3CO_2$, CsBr, CsI, $CsHCO_2$, $CsCH_3CO_2$, and mixtures thereof.

4. The method of claim 1, wherein the viscosified brine further includes one or more additives selected from the group consisting of: a rheology modifier, a surface tension reducer, a thermal stabilizer, a coalescing agent, a soluble weighting agent and insoluble weighting agent, a soluble bridging agent, and insoluble bridging agent, a sealant or combinations or mixtures thereof.

5. The method of claim 1, wherein the method further comprises inserting an injection tube into the casing annulus and injecting the viscosified brine into the casing annulus by way of the injection tube.

6. The method of claim 1, wherein the method further comprises bleeding off the less dense casing annulus fluid simultaneously with the injection of the viscosified brine.

7. The method of claim 1, wherein the method further comprises bleeding off the less dense casing annulus fluid subsequent to injecting the viscosified brine.

8. A method for the remediation of a sustained casing annulus pressure in a casing annulus of a subterranean well, wherein the casing annulus contains a casing annulus fluid, the method including injecting a brine having a density higher than the density of the casing annulus fluid, the improvement comprising formulating the brine to include a viscosifying agent in a concentration to make the brine fall down the casing annulus without dispersing and thus displacing the casing annulus fluid.

* * * * *